United States Patent
Christophliemke et al.

(10) Patent No.: US 11,913,101 B2
(45) Date of Patent: Feb. 27, 2024

(54) PIPE ELEMENT FOR GAS PRESSURE VESSEL, AND GAS PRESSURE VESSEL

(71) Applicant: Benteler Steel/Tube GmbH, Paderborn (DE)

(72) Inventors: Wigbert Christophliemke, Schloß Holte-Stukenbrock (DE); Leonhard Rose, Borchen (DE); Marcel Wellpott, Paderborn (DE)

(73) Assignee: Benteler Steel/Tube GmbH (DE)

( * ) Notice: Subject to any disclaimer, the term of this patent is extended or adjusted under 35 U.S.C. 154(b) by 251 days.

(21) Appl. No.: 16/982,899

(22) PCT Filed: Mar. 20, 2019

(86) PCT No.: PCT/EP2019/056973
§ 371 (c)(1),
(2) Date: Sep. 21, 2020

(87) PCT Pub. No.: WO2019/180087
PCT Pub. Date: Sep. 26, 2019

(65) Prior Publication Data
US 2021/0002749 A1    Jan. 7, 2021

(30) Foreign Application Priority Data
Mar. 20, 2018    (DE) ............... 10 2018 106 546.9

(51) Int. Cl.
*C22C 38/54*    (2006.01)
*B21C 37/15*    (2006.01)
(Continued)

(52) U.S. Cl.
CPC ............. *C22C 38/54* (2013.01); *B21C 37/15* (2013.01); *B21D 15/04* (2013.01); *B21D 17/02* (2013.01);
(Continued)

(58) Field of Classification Search
CPC ......... C22C 38/54; C22C 38/28; C22C 38/32; C22C 38/40; C22C 38/22; C22C 38/26;
(Continued)

(56) References Cited

U.S. PATENT DOCUMENTS

| | | |
|---|---|---|
| 2005/0000601 A1 | 1/2005 | Arai et al. |
| 2007/0246130 A1 | 10/2007 | Takano |
| 2017/0341619 A1* | 11/2017 | Tegethoff ............... C21D 6/008 |

FOREIGN PATENT DOCUMENTS

| | | |
|---|---|---|
| CN | 101374966 | 2/2009 |
| CN | 101528964 | 9/2009 |

(Continued)

*Primary Examiner* — Michael E. La Villa
(74) *Attorney, Agent, or Firm* — Pandiscio & Pandiscio

(57) ABSTRACT

A tubular element for a gas pressure container of an airbag system of a motor vehicle, wherein the tubular element (10) consists of a material which, in addition to iron and impurities due to melting, comprises the following alloying elements in the ranges indicated in percent by weight:

| | |
|---|---|
| C | 0.05-0.2% |
| Si | ≤0.9% |
| Mn | 0.2-2.0% |
| Cr | 0.05-2% |
| Mo | <0.5% |
| Ni | <1.0% |
| Nb | 0.005-0.10% |
| Al | <0.07% |
| Ti | <0.035% and |
| B | <0.004%. |

14 Claims, 3 Drawing Sheets

(51) Int. Cl.
| | |
|---|---|
| B21D 15/04 | (2006.01) |
| B21D 17/02 | (2006.01) |
| B21H 7/18 | (2006.01) |
| B21K 21/12 | (2006.01) |
| B32B 1/08 | (2006.01) |
| B32B 3/30 | (2006.01) |
| B32B 15/01 | (2006.01) |
| B32B 15/18 | (2006.01) |
| B60R 21/261 | (2011.01) |
| C21D 7/13 | (2006.01) |
| C21D 9/14 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/18 | (2006.01) |
| C22C 38/22 | (2006.01) |
| C22C 38/26 | (2006.01) |
| C22C 38/28 | (2006.01) |
| C22C 38/32 | (2006.01) |
| C22C 38/40 | (2006.01) |
| C22C 38/44 | (2006.01) |
| C22C 38/48 | (2006.01) |
| C22C 38/50 | (2006.01) |
| F16L 9/00 | (2006.01) |
| F16L 9/02 | (2006.01) |
| F16L 9/22 | (2006.01) |
| B60R 21/26 | (2011.01) |

(52) U.S. Cl.
CPC ............ *B21H 7/182* (2013.01); *B21K 21/12* (2013.01); *B32B 1/08* (2013.01); *B32B 3/30* (2013.01); *B32B 15/01* (2013.01); *B32B 15/011* (2013.01); *B32B 15/18* (2013.01); *B60R 21/261* (2013.01); *C21D 7/13* (2013.01); *C21D 9/14* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/40* (2013.01); *C22C 38/44* (2013.01); *C22C 38/48* (2013.01); *C22C 38/50* (2013.01); *F16L 9/006* (2013.01); *F16L 9/02* (2013.01); *F16L 9/22* (2013.01); *B60R 21/26* (2013.01); *B60R 2021/2612* (2013.01); *Y10T 428/12292* (2015.01); *Y10T 428/12354* (2015.01); *Y10T 428/12382* (2015.01); *Y10T 428/12951* (2015.01); *Y10T 428/12958* (2015.01); *Y10T 428/12965* (2015.01); *Y10T 428/12993* (2015.01)

(58) Field of Classification Search
CPC ......... C22C 38/02; C22C 38/04; C22C 38/06; C22C 38/44; C22C 38/48; C22C 38/50; C22C 38/08; C22C 38/12; C22C 38/14; C22C 38/18; B21K 21/12; B21C 37/15; B21D 15/04; B21D 17/02; C21D 7/13; C21D 9/14; B21H 7/182; B60R 2021/2612; B60R 21/261; B60R 21/26; F16L 9/006; F16L 9/02; F16L 9/22; Y10T 428/12951; Y10T 428/12958; Y10T 428/12993; Y10T 428/12965; Y10T 428/12354; Y10T 428/12292; Y10T 428/12382; B32B 1/08; B32B 3/30; B32B 15/01; B32B 15/011; B32B 15/18
See application file for complete search history.

(56) References Cited

FOREIGN PATENT DOCUMENTS

| | | |
|---|---|---|
| CN | 105517722 | 4/2016 |
| CN | 106457327 | 2/2017 |
| CN | 107000666 | 8/2017 |
| DE | 41 38 888 | 11/1991 |
| DE | 10 2014 018 816 | 6/2016 |
| EP | 1 678 335 | 7/2006 |
| JP | 2001-192773 | 7/2001 |
| JP | 2004-076034 | 3/2004 |
| WO | WO 2015/026563 | 2/2015 |
| WO | WO 2016/095909 | 6/2016 |

\* cited by examiner

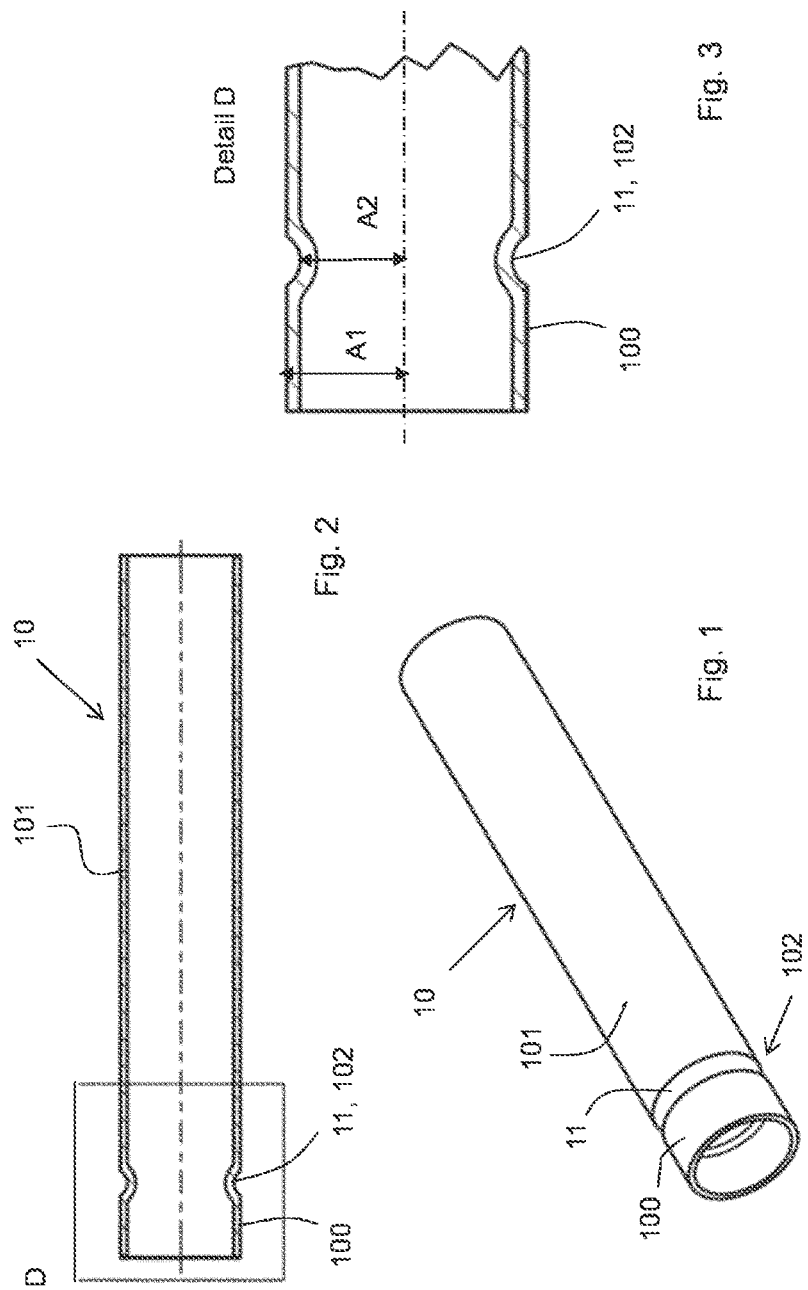

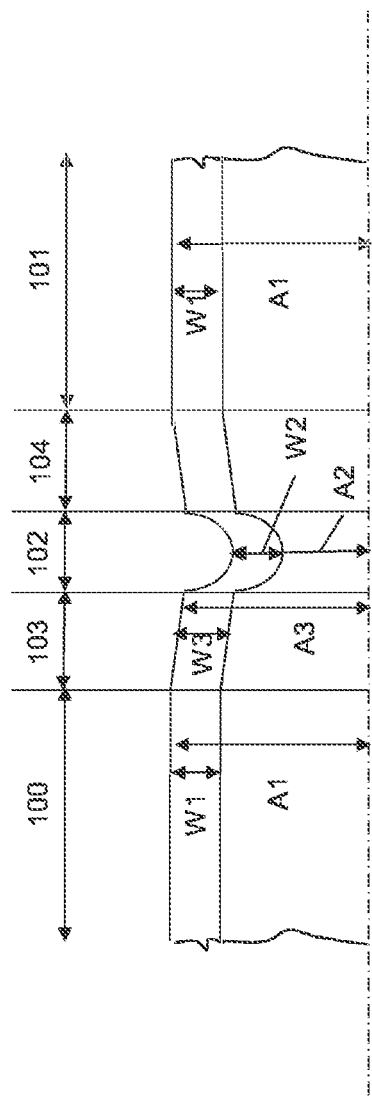

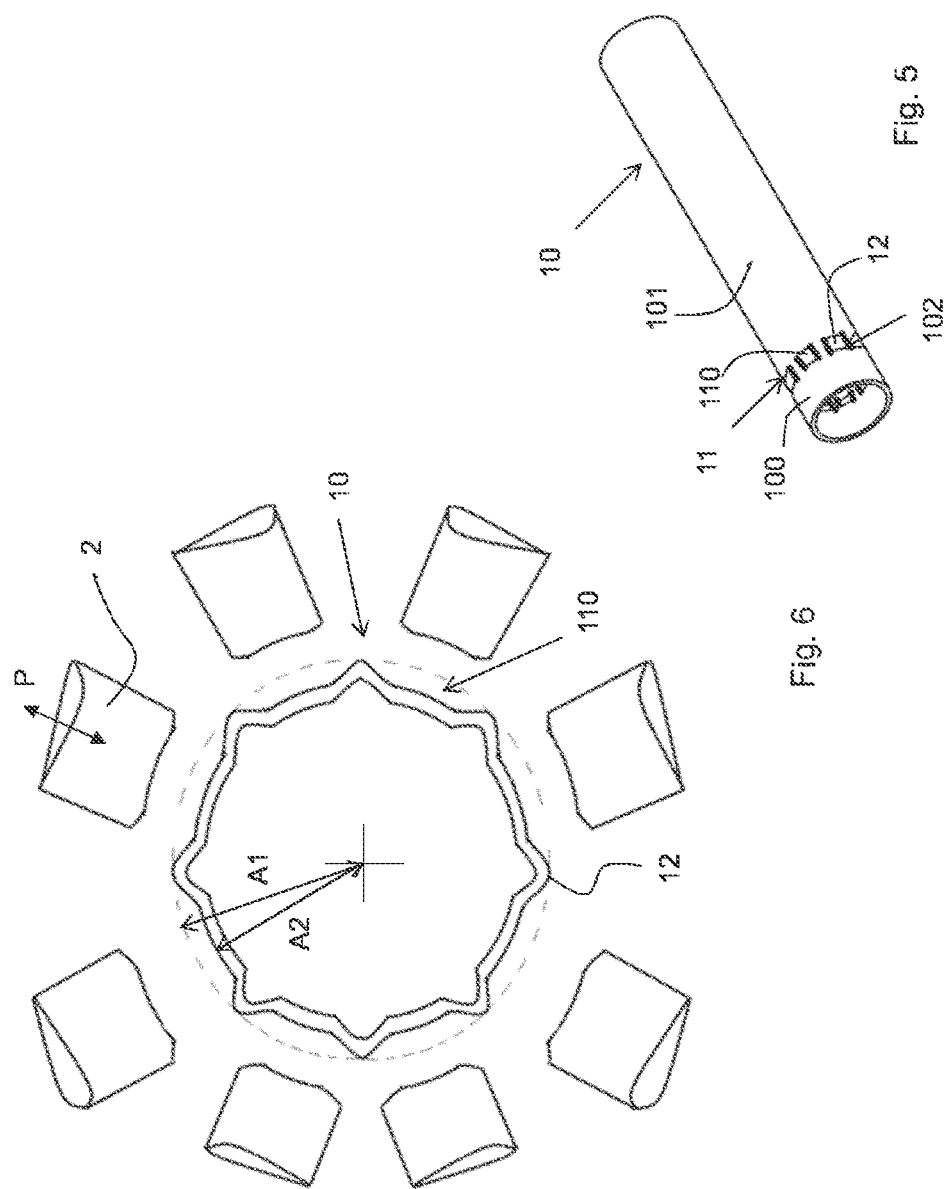

PIPE ELEMENT FOR GAS PRESSURE VESSEL, AND GAS PRESSURE VESSEL

REFERENCE TO PENDING PRIOR PATENT APPLICATION

This patent application is 371 national stage entry of prior International (PCT) Patent Application No. PCT/EP2019/056973, filed Mar. 20, 2019, which patent application in turn claims benefit of German Patent Application No. DE 10 2018 106 546.9, filed Mar. 20, 2018.

The two (2) above-identified patent applications are hereby incorporated herein by reference

FIELD OF THE INVENTION

The present invention relates to a tubular element for a gas pressure container for an airbag system and to a gas pressure container with such a tubular element.

BACKGROUND OF THE INVENTION

In a system which is subjected to high pressure, such as an airbag system of a motor vehicle, it is necessary to use tubular elements which can withstand this pressure. In airbag systems or airbag modules, for example, gas pressure containers must be used which form, for example, the housing of the gas generator and/or the reaction chamber. In particular these gas pressure containers and the tubular element, which mainly forms the gas generator, must be able to withstand high internal pressure.

For this reason, it is known to use high-strength materials for tubular elements for gas pressure containers. At the same time, however, the tubular element must have geometries that allow, for example, the attachment or installation of further components. For example, the tubular elements can have recesses on the circumference of the tube. However, it is necessary for the safe operation of the gas pressure container that it does not fail in spite of the geometry that has been formed.

SUMMARY OF THE INVENTION

The invention is based on the task to provide a tubular element for a gas pressure container and a gas pressure container which allows safe operation of the gas pressure container.

According to a first aspect, the task is solved by a tubular element for a gas pressure container of an airbag system of a motor vehicle, wherein the tubular element has at least a first length section and at least one recess extending in the circumferential direction. The tubular element is characterized, in that the tubular element has at least one second length section formed by the recess extending over at least part of the circumference of the tubular element,
in that the second length section lies between a first length section and a second length section,
in that in at least one first length section the outer radius of the tubular element is greater than the smallest outer radius of the at least one second length section,
that the tubular element has a tensile strength of >920 MPa,
that the wall thickness of the tubular element in the at least one second length section is thicker than or equal to the wall thickness in the at least one first length section of the tubular element,
in that the degree of reduction of the outer radius in the recess is in the range from 5 to 35% relative to the outer radius of at least a first length section, and
in that the tubular element consists of a material which, in addition to iron and impurities resulting from the melting process, comprises the following alloying elements in the ranges indicated in percent by weight:

| | |
|---|---|
| C | 0.05-0.2% |
| Si | ≤0.9% |
| Mn | 0.2-2.0% |
| Cr | 0.05-2% |
| Mo | <0.5% |
| Ni | <1.0% |
| Nb | 0.005-0.10% |
| Al | <0.07% |
| Ti | <0.035% and |
| B | <0.004%. |

The gas pressure container of an airbag system of a motor vehicle preferably denotes the housing of a gas generator of an airbag system of a motor vehicle. Gas is stored or produced in the gas pressure container. Additionally, gas is released from the gas pressure container at high speed. The gas generator then fills the airbag with gas. The gas generator, herein, can be a cold gas generator or a hybrid gas generator. In these gas generators at least one tubular element is provided, which serves in particular as compressed gas storage and/or expansion chamber for gas. The tubular element can be the housing of an airbag generator, for example the injector. A large force is applied spontaneously to these tubular elements. The material of the tubular element must be able to withstand this force in order to prevent the tubular element from bursting. A cold gas generator consists of a gas container, in which gas is stored under high pressure, and an activator. The gas container is closed by a membrane. When the gas generator is triggered, the membrane is destroyed, especially by an explosive charge, and the gas can flow out of the gas container. Alternatively, the gas generator according to the invention can also be a hybrid gas generator. This is a combination of a pyrotechnic generator and a cold gas generator. In a hybrid gas generator, in addition to the gas pressure container, a pyrotechnic assembly is also provided for gas generation.

Due to the internal pressure load on the tubular element of the gas generator, for example an airbag module, the direction of the highest load on the tube material is transverse to the tube axis. This state of stress leads to a crack propagating parallel to the tube axis, for example, if a crack is produced or formed during the production or forming of the tubular element.

The tubular element is preferably a tubular element with a round cross-section. The tubular element comprises at least one first length section and at least one recess running in the circumferential direction. The circumferential recess is preferably a recess produced by non-cutting machining. The recess can also be called an embossing or bead. The first length section is herein defined as a part of the length of the tubular element. According to the invention, this first length section is the length section which is not or only slightly deformed during the forming of the tubular element for forming the recess. Preferably, the outer radius of the tubular element in the at least one first length section is constant over its length. Further preferably, also the wall thickness of the tubular element is constant in the first length section.

Furthermore, the tubular element comprises at least one second length section, which is formed by the recess. In particular, the second length section is the part of the length of the tubular element which corresponds to the width, i.e. the dimension in axial direction, of the recess. According to the invention, the recess extends over at least a part of the circumference of the tubular element. The recess is aligned such that the depression formed by the recess is directed inwards in the radial direction of the tubular element. The recess has the geometry which corresponds to the contour of the tool by which the recess is inserted.

In at least one first length section the outer radius of the tubular element is greater than the smallest outer radius of the at least one second length section. The smallest outer radius of the second length section is the outer radius at the deepest point of the recess.

According to the invention, the second length section lies between two first length sections. This means that the recess is inserted between two first length sections. The second length section can be directly adjacent to the first length section. However, it is also possible that between a second length section and the adjacent first length sections, respectively, there is a third length section, which will be described in more detail later.

According to the invention, the tubular element has a tensile strength of >920 MPa. Preferably the tubular element comprises a tensile strength of >1000 MPa. This tensile strength is preferably present at least in the first length sections and/or in the second length section and/or third length section.

Additionally, the wall thickness of the tubular element in the at least one second length section is thicker or equal to the wall thickness in at least one first length section of the tubular element. The second length section is the part of the length in which the recess is inserted. For example, during pressure rolling, crimping or pressing, when forming to produce the recess, the wall thickness of the tubular element is usually reduced in this area. However, since this area is also subjected to the stresses during operation of the gas generator, according to the invention a wall thickness is also provided in this second length section which is equal to or thicker than the wall thickness of the first length section. The wall thickness can be adjusted before or during the forming of the tube. During the forming process a material flow control or an adjustment of the wall material flow during the creation of the recess can be performed. In particular a material flow directed towards the recess or a material displacement can be set. This can also prevent or compensate for damage to the tube during the insertion of the recess.

According to the invention, the degree of reduction of the outer radius in the recess is in the range of 5 to 35% relative to the outer radius of at least a first length section. In particular, the degree of reduction in the recess can be in the range of 10 to 25% relative to the outer radius of at least a first length section. In case of two first length sections which comprise different outer radii, the degree of reduction is preferably related to the greater outer radius. This means that the recess has a large depth and installation or attachments parts can be reliably held in place. Such a large degree of reduction is possible with the tubular element according to the invention, as the wall thickness in the second length section is thicker or equal to the wall thickness in the first length section.

Additionally the tubular element consists of a material which, in addition to iron and impurities resulting from the melting process, includes the following alloying elements in the ranges indicated in percent by weight:

| | |
|---|---|
| C | 0.05-0.2% |
| Si | ≤0.9% |
| Mn | 0.2-2.0% |
| Cr | 0.05-2% |
| Mo | <0.5% |
| Ni | <1.0% |
| Nb | 0.005-0.10% |
| Al | <0.07% |
| Ti | <0.035% and |
| B | <0.004%. |

This material is a high-strength and particularly cold-tough material, such that it can withstand the stresses and strains of operating the gas generator. Due to the thickness of the material, which is present in the second length section during and after the forming of the recess, despite the high degree of reduction, damage in the second length section does not have to be feared.

The alloying elements of the material of which the tubular element consists contribute to the achievement of the required properties of the tubular element for use in a gas pressure container. The indications of proportion of the alloying elements are given in weight percent, even if this is not explicitly mentioned in the following, but only referred to as a percentage. The material from which the tubular element is produced is also referred to as alloy, steel alloy or steel.

Carbon (C) is added in an amount of at least 0.05% to achieve a martensitic structure and a desired strength of the martensite. However, too high a C-content would, among other things, have a negative effect on weldability. According to the invention, the C-content is therefore limited to a maximum of 0.2%. Preferably, the carbon content is in a range of 0.08 to 0.2 and particularly preferably in the range of 0.08 to 0.13%.

Manganese (Mn) increases the strength in steel by its solid solution strengthening effect. Furthermore, as the Mn-content increases, the austenite transformation is delayed, which leads to an increase in through hardenability and the formation of martensite during quenching and tempering. As alloys solidify over a temperature interval, local areas, e.g. interdendritic spaces, which have different chemical compositions are present at the end of solidification. This distribution of areas with different chemical compositions is also referred to in the following as microstructure banding. The tube from which the tubular element is produced, for example, is produced by drawing and/or rolling. As a result of the tube production process, the microsegregations in the starting material are rolled or drawn in the longitudinal direction and can lead to microstructure banding. Alloying elements generally have certain solid solution strengthening effects in the material, which depend on how strongly the crystal lattice of iron is distorted by the corresponding element. Elements which have a strong solid solution strengthening effect, such as manganese or silicon, result in that the microstructure bands with different element contents, which are pronounced in the longitudinal direction, have different strengths. This is in particular disadvantageous, in case the tubular element is subjected to internal pressure, especially an airbag tube, as the main load by the internal pressure lies in the circumferential direction of the tube and thus runs transversely through the microsegregation bands. The bands with low strength herein represent a weakening or metallurgical notch. Among other things, this weakening has a negative effect on the transition temperature of the material. According to the invention, manganese is used in a content of less than 2.0%. Thereby, the strong solid solution strengthening effect of manganese can be minimized and thus the microstructure banding can be reduced. However, according to the invention, manganese is added in an amount of at least 0.2%. This allows any Sulphur, which may be present in the material, to be bound. Preferably, the manganese content of the steel alloy is in the range of 0.4 to 0.6 wt.-%. According to the invention, these low manganese contents are possible because the through hardenability, which must be ensured by adding manganese in other alloys, is partly achieved, according to the invention, by the increased chromium content. However, according to the invention, manganese can also be added in an amount ranging from 1.2 to 2%.

Silicon (Si) has a deoxidizing and strongly solid solution strengthening effect in steel, which is stronger than the effect of manganese. Therefore, according to the invention, the content of silicon in the material is limited to a maximum of 0.9%, and for example to a maximum of 0.5%, to a maximum of 0.4% or to a maximum of 0.1%.

Chromium (Cr) delays the austenite transformation in steel which is necessary to obtain a high strength martensitic structure. Thus, the addition of chromium improves the through hardenability of the material and thus of the tubular element. Since the alloy according to the invention can contain little manganese, the through hardenability is achieved by the addition of chromium. Chromium can be added in an amount of more than 0.05% or more than 0.6% or more than 0.8%. Chromium additionally has a lower solid solution strengthening effect in steel than manganese. For this reason, the weakening of the material in the circumferential direction of the tube due to microsegregation and thus the microstructure banding is significantly smaller than when larger quantities of manganese are added. Among other things, this can positively affect the cold toughness and the transition temperature, i.e. it can be shifted towards lower temperatures. To achieve the necessary through hardenability, the chromium content in the material is, according to the invention, in the range between 0.05 and 2.0%. Preferably, the chromium content in the material is in the range between 0.8% and 1.0%. Alternatively, the chromium content can also be in the range between 0.05 and 0.6%.

Molybdenum (Mo) increases the strength of steel by its solid solution strengthening effect and carbide precipitation. At the same time molybdenum delays the austenite transformation. This improves the through hardenability. Additionally, molybdenum acts to prevent temper embrittlement. According to the invention, the molybdenum content is limited to a maximum of 0.5 wt. %, and preferably to 0.3 wt. %.

It was found that intense carbide formation occurs at a molybdenum content of more than 0.5 wt. %. Due to binding of carbon in these carbides, an insufficient amount of dissolved carbon is present in the austenitic matrix during the hardening process. Therefore, this would lead to a reduction in the hardenability of the steel alloy and thus to a reduction in strength during hardening.

Nickel (Ni) is used to improve the toughness of steels. It has been found that the addition of nickel is beneficial to achieve a noticeable improvement in toughness. However, nickel is an expensive element. Therefore, the Ni-content is limited to a maximum of 1.0 wt. % according to the invention. A nickel content in the range of 0.1-0.4 wt. % has proven to be particularly preferred. Herein a sufficient improvement in the toughness of the material can be achieved at tolerable costs.

According to the invention, niobium (Nb) is added in an amount in the range of 0.005-0.1 wt. %. The addition of niobium raises the recrystallisation temperature of the material. This has a positive effect on the fine grain formation during manufacturing of the tubular element. The fine grain increases the toughness of the steel and contributes to lowering the transition temperature. It was found that a content of at least 0.005 wt. % niobium is necessary to achieve a noticeable improvement. It was additionally found that the niobium content should be at maximum of 0.1 wt. %. At a higher niobium content, the formation of undesirable primary coarse niobium carbides was detected, which have a negative effect on the toughness of the material. Without the addition of niobium or with an addition of less than 0.005 wt. %, it is not possible to achieve the properties required for a tubular element of a gas generator.

As the tubular element according to the invention consists of a high-strength material and has a high degree of reduction in the area of the recess, it can, on the one hand, withstand the loads during use of the tubular element. On the other hand, due to the wall thickness in the area of the recess according to the invention, which can be achieved, for example, by controlling the material flow during the forming of the recess, a failure of the tubular element due to defects in the material of the tubular element or due to insufficient wall thickness can be prevented. This applies all the more in case of a preferred embodiment of the invention according to which the wall thickness of the tubular element in the first wall section is only from 1.0 to 2.5 mm.

According to a preferred embodiment, the material comprises, in addition to iron and impurities resulting from the melting process, the following alloying elements in the ranges indicated in percent by weight

| | |
|---|---|
| C | 0.08-0.13% |
| Si | ≤0.1% |
| Mn | 0.4-0.6% |
| Cr | 0.8-1.0% |
| Mo | 0.1-0.5% |
| Ni | 0.1-0.4% and |
| Nb | 0.005-0.10%. |

The material may optionally contain at least one of the following alloying elements within the ranges specified in weight percent:

| | |
|---|---|
| P | <0.020% |
| S | <0.005% |
| Ti | <0.015% and |
| Al | 0.001-0.05% |

Titanium (Ti) has a high affinity to nitrogen. Titanium nitrides are already formed during solidification and thus reach several microns in size (20 μm). Titanium nitrides have a higher hardness compared to martensite and cause the formation of metallurgical notches in the material under mechanical stress. Due to the titanium nitrides, the stress distribution in the material is distributed inhomogeneously and thus promotes uncontrolled (brittle) failure and increase of the transition temperature, respectively. According to the invention, the titanium content is therefore limited to a maximum of 0.035%, preferably a maximum of 0.015%. Preferably, titanium is present at least in an amount of 0.01% and, particularly preferred, in a range of 0.01-0.035%.

Sulphur (S) is an undesirable element in steel as it negatively affects toughness by forming sulphides. Therefore, the S-content is limited to a maximum of 0.005%.

Phosphorus (P) is an undesirable element in the steel, as it leads to segregation and embrittlement during tempering (temper embrittlement) and thus has a negative effect on the toughness and transition temperature, respectively. The P-content is therefore limited to a maximum of 0.02%.

According to a preferred embodiment, the material comprises, in addition to iron and impurities resulting from the melting process, the following alloying elements in the ranges indicated in percent by weight

| | |
|---|---|
| C | 0.08-0.20% |
| Si | ≤0.4% |
| Mn | 1.2-2% |
| Cr | 0.05-0.6% |
| Mo | 0.05-0.5% |
| Ni | 0.1-0.4% |
| Nb | 0.005-0.050% |
| Al | 0.01-0.07% |
| Ti | 0.01-0.035% and |
| B | 0.001-0.004%. |

According to one embodiment, the recess in the tubular element, which forms a second length section, is a circumferential recess. The recess extends over the entire circumference of the tubular element and forms a continuous recess. The recess is hereinafter also referred to as the annular bead. Such a recess can for example be inserted into the tube by pressure rolling, stamping, pressing or crimping. In particular, the recess can be inserted by rotating tools such as pressure rollers with a contour corresponding to the recess. An advantage of a tubular element into which an annular bead has been formed is that it can be used to insert an internal component, such as the inner wall of a gas pressure container, for example.

As an alternative to or in addition to an annular bead, the tubular element has at least one recess which forms a second length section and is an interrupted recess in the circumferential direction. In this embodiment, the recess comprises several partial recesses which are arranged at a distance from one another in the circumferential direction. The recess is therefore divided by interruptions. In the interruptions, the outer radius of the second length section preferably corresponds to the outer radius of the first length section. In any case, the outer radius of the interruption of the recess is greater than the outer radius of the partial recesses. This embodiment has the advantage that the production of the tubular element is simplified. Especially the rotation of tools is not necessary.

Preferably, the second length section directly abuts to the first length section. This means that the reduction of the outer radius in the second length section corresponds exclusively to the contour of the tool for inserting the recess.

If the insertion of the recess results in a tapering or collapse adjacent to the second length section, tapering or collapse is small according to the invention. The tapering is also called the third length section. According to a preferred embodiment, the third length section formed between a first length section and an adjacent second length section, in which the outer radius decreases from the outer radius of the first length section to the axially outer edge of the recess, has a length of at most 2.5 times the wall thickness in the first length section. The length of the third length section is the extension in axial direction of the tubular element.

Preferably the tubular element is free of near-surface tube defects. This can be guaranteed especially by the wall thickness of the second length section. The near-surface tube defects are especially depressed wall, internal plication, internal defects (stress cracks) or excess rolling. These near-surface tube defects usually lead to crack formation. Near-surface tube defects, which can occur during the manufacturing of the tube, are intensified when the recess is inserted, where the wall thickness of the recess is reduced. With the tubular element according to the invention, to the contrary, these near-surface tube defects are confined or even reduced.

The tubular element according to the invention can be produced from a seamless tube or a welded tube. By using a seamless tube, the risk of failure of the tubular element of the gas pressure container can be further reduced. Such a seamless tube is hot rolled, for example by the Mannesmann-Erhard method, and then preferably cold drawn at least once to its final dimensions. Alternatively, a hot-rolled tube can also be extruded instead of being drawn.

In the case of a tubular element produced from a welded tube, damage in the area of the welding seam and heat-affected zone is to be expected, especially when inserting the recess which reduces the wall thickness. In the case of the tubular element according to the invention, cracks with a maximum length of 50 μm, preferably with a maximum length of 20 μm, are present in the area of the welding seam and heat-affected zone in which the second length section is located. Particularly preferred, the area of the welding seam and heat-affected zone are free of cracks. This is ensured, among other things, by the wall thickness of the tubular element in the second length section, which is thicker or equal to the wall thickness in the first length section.

According to another aspect, the invention relates to a gas pressure container for an airbag system of a motor vehicle, wherein the gas pressure container comprises at least one tubular element according to the invention.

Advantages and features which are described with respect to the tubular element apply—if applicable—correspondingly to the gas pressure container and vice versa.

BRIEF DESCRIPTION OF THE DRAWINGS

In the following, the invention is again explained with reference to enclosed figures. wherein:

FIG. 1 shows a schematic perspective view of a first embodiment of the tubular element according to the invention;

FIG. 2 shows a schematic cross-sectional view of the first embodiment of the tubular element according to the invention;

FIG. 3 shows a detailed view of detail D from FIG. 2;

FIG. 4 shows a schematic detailed view of a part of a second embodiment of the tubular element according to the invention;

FIG. 5 shows a schematic perspective view of a third embodiment of the tubular element according to the invention; and FIG. 6 shows a schematic axial view of the third embodiment of the tubular element according to the invention during production.

DETAILED DESCRIPTION OF THE PREFERRED EMBODIMENTS

FIG. 1 shows a schematic perspective view of a first embodiment of the tubular element 10 according to the invention. The schematic cross-sectional view of this tubular element is shown in FIGS. 2 and 3. The tubular element 10 has a first length section 100 at one end. In this first length section 100, the tubular element 10 has an outer radius A1.

This outer radius A1 is constant over the length of the first length section 100. Additionally, in the depicted embodiment, the wall thickness of the tubular element is also constant in the first length section 100. In the axial direction, the first length section 100 is followed by a second length section 102, which is formed by a recess 11. The recess 11 in the first embodiment of the tubular element 10 is an annular bead. The outer radius A2 at the deepest point of the recess 11 is smaller than the outer radius A1 of the first length section 100. In the depicted embodiment, the recess 11 comprises an arcuate shape. The wall thickness in the second length section 102 corresponds to the wall thickness in the first length section 100.

The recess 11 may have been formed by one or more pressure rollers (not shown) having a corresponding contour on their outer circumference. Particularly the recess 11 may have been formed by pressure rolling or embossing. Before or during the insertion of the recess 11, a specific material flow control is carried out to prevent the reduction of the wall thickness in the second length section 102. The tube into which the recess 11 is inserted to produce the tubular element 10 has the outer radius A1 and the wall thickness of the first length section 100.

In the axial direction, a further first length section 101 follows the recess 11 and thus the second length section 102. This length section 101 corresponds in wall thickness and outer radius A1 to the dimensions of the first length section 100, which is located at the one end of the tubular element 10. Thus, the tubular element 10 comprises a constant outer radius A1 except in the second length section 102.

FIG. 4 shows a second embodiment of the tubular element 10 according to the invention. In this embodiment, between the two first length sections 100, 101 and the intermediate second length section 102, a third length section 103, 104 is formed. In said third length sections 103, 104, the outer radius A1 decreases from the respective adjacent first length section 100, 101 to the axially outer end of the second length section 102. The wall thickness W3 is preferably constant in the third length sections 103, 104. The third length sections 103, 104 can also be described as tapering or collapse of the wall of the tubular element 10 and are generated by the insertion of the recess 11. However, it is also within the scope of the invention that the tubular element 10 does not comprise third length sections 103, 104. This can be achieved, for example, by specific material flow control or by applying pressure when inserting the recess 11. Also, in the second embodiment shown in FIG. 4, the third length sections 103, 104 are kept small and their axial length preferably corresponds at most to 2.5 times the wall thickness of the first length sections 100, 101. The wall thickness W3 of the third length section 103 corresponds at least to the wall thickness W1 of the first length sections 100, 101. The wall thickness W2 in the second length section 102 is preferably equal to or greater than the wall thickness W3 in the third length sections 103, 104.

FIGS. 5 and 6 show a third embodiment of the tubular element 10. In this embodiment, the second length section 102 is formed by a recess 11, which comprises interruptions 12 in the circumferential direction. The recess 11 is therefore formed by individual partial recesses 110, which are distributed in the circumferential direction of the tubular element 10. FIG. 6 schematically shows how the tubular element 10 according to the third embodiment is produced. The tool 2, which is used for manufacturing, consists of several radially adjustable segments. In FIG. 6, the tool 2 consists of eight segments which, as indicated by the arrow P, can be moved radially towards and away from the tube from which the tubular element 10 is to be formed. The tool 2 is a pressing tool. The tool 2 is used to insert partial recesses 110 into the tube wall. Between these partial recesses 110 there are interruptions 12. The outer radius A2 of the partial recesses 110 is referred to as the outer radius of the second length section 102. In the interruptions 12, the tubular element 10 has an outer radius that corresponds to the outer radius A1 of the first length sections 100, 101 or that is slightly smaller than the outer radius A1. In any case, however, the outer radius of the interruptions 12 is greater than the outer radius A2 in the area of the partial recesses 110. The wall thickness of the tubular element 10 in the area of the partial recesses 110 is equal to or thicker than the wall thickness in the first length sections 100, 101.

With the present invention a tubular element for a gas pressure container is created, which can be made from a seamless or welded tube, which consists of a high-strength material and which nevertheless comprises recesses, which can have a great depth, i.e. a high degree of reduction of the outer radius. Despite the deep recess, the tubular element has few or no tube defects even in the area of the welding seam. For this purpose, especially the wall thickness of the tubular element in the area of the recess is set to be equal to or thicker than the wall thickness of the tube from which the tubular element is made.

The invention has a number of advantages. In particular, the tubular element with recess(es), for example one or more annular beads, can be produced reliably from a tube of high-strength material and this tubular element can be used in gas pressure containers, for example as a housing tube of an airbag generator, without having to fear failure. Due to the recesses, the installation or attachment of further parts of the gas pressure container, such as a bursting disc, can be simplified. Additionally, the stability of the tubular element is further increased by inserting the recess with large wall thickness.

LIST OF REFERENCE SIGNS

| | |
|---|---|
| 10 | tubular element |
| 100 | first length section |
| 101 | first length section |
| 102 | second length section |
| 103 | third length section |
| 11 | recess |
| 110 | partial recess |
| 12 | interruption |
| A1 | outer diameter first length section |
| A2 | outer diameter second length section |
| A3 | outer diameter third length section |
| W1 | wall thickness first length section |
| W2 | wall thickness second length section |
| W3 | wall thickness third length section |
| 2 | tool |
| P | arrow |

The invention claimed is:

1. Tubular element for a gas pressure container of an airbag system of a motor vehicle, wherein the tubular element (10) comprises at least two first length sections (100, 101) and at least one recess (11) extending in the circumferential direction, characterized in that:
the tubular element (10) comprises at least one second length section (102) formed by the recess (11) extending over at least part of the circumference of the tubular element (10), the second length section (102) lies between the at least two first length sections (100, 101), in each of the at least two first length sections (100, 101) the outer radius (A1) of the tubular element (10) is greater than the smallest outer radius (A2) of the at least one second length section (102), the tubular element (10) comprises a tensile strength of >920 MPa, the wall thickness (W2) of the tubular element (10) in the at least one second length section (102) is thicker than or equal to the wall thickness (W1) in the at least two first length sections (100, 101) of the tubular element (10), the degree of reduction of the outer radius (A2) in the recess (11) lies in the range from 5 to 35% relative to the outer radius (A1) of the at least two first length sections (100, 101), between one of the at least two first length sections (100, 101) and an adjacent second length section (102) a tapering third length section is formed, in which the outer radius (A3) of the tapering third length section decreases from the outer radius (A1) of at least one of the at least two first length sections (100, 101) to the axially outer edge of the recess (11), and the tapering third length section has a length of at most 2.5 times the wall thickness (W1) in the at least two first length sections (100, 101), and the tubular element (10) consists of a material which, in addition to iron and impurities resulting from the melting process, comprises the following alloying elements in the ranges indicated in weight percent:

| | |
|---|---|
| C | 0.05-0.2% |
| Si | ≤0.9% |
| Mn | 0.2-2.0% |
| Cr | 0.05-2% |
| Mo | <0.5% |
| Ni | <1.0% |
| Nb | 0.005-0.10% |
| Al | <0.07% |
| Ti | <0.035% and |
| B | <0.004%. |

2. Tubular element according to claim 1, characterized in that the tubular element (10) has a tensile strength Rm of >1000 MPa.

3. Tubular element according to claim 1, characterized in that the degree of reduction of the outer radius in the recess (11) is in the range from 10 to 25% relative to the outer radius (A1) of the at least two first length sections (100, 101).

4. Tubular element according to claim 1, characterized in that at least one recess (11) forms the at least one second length section (102).

5. Tubular element according to claim 4, characterized in that the at least one recess (11) which forms the at least one second length section (102) is a circumferentially interrupted recess (110).

6. Tubular element according to claim 1, characterized in that the tubular element (10) is free from near-surface tube defects.

7. Tubular element according to claim 1, characterized in that the tubular element (10) is made of a welded tube.

8. Tubular element according to claim 7, characterized in that in the area of the welding seam and heat-affected zone of the tubular element (10), which is located in the second length section (102), only cracks to a maximum length of 50 μm are present and the area of the welding seam and heat-affected zone is free of cracks.

9. Tubular element according to claim 7 characterized in that in the area of the welding seam and heat-affected zone of the tubular element (10), which is located in the second length section (102), only cracks to a maximum length of 20 μm are present and the area of the welding seam and heat-affected zone is free of cracks.

10. Tubular element according to claim 1, characterized in that the material comprises, in addition to iron and impurities resulting from the melting process, the following alloying elements in the ranges indicated in weight percent:

| | |
|---|---|
| C | 0.08-0.13% |
| Si | ≤0.1% |
| Mn | 0.4-0.6% |
| Cr | 0.8-1.0% |
| Mo | 0.1-0.5% |
| Ni | 0.1-0.4% and |
| Nb | 0.005-0.10%. |

11. Tubular element according to claim 1, characterized in that the material comprises at least one of the following alloying elements in the ranges given in percent by weight:

| | |
|---|---|
| P | <0.020% |
| S | <0.005% |
| Ti | <0.015% and |
| Al | 0.001-0.05% |

12. Tubular element according to claim 1, characterized in that the material comprises, in addition to iron and impurities resulting from the melting process, the following alloying elements in the ranges indicated in percent by weight:

| | |
|---|---|
| C | 0.08-0.20% |
| Si | ≤0.4% |
| Mn | 1.2-2% |
| Cr | 0.05-0.6% |
| Mo | 0.05-0.5% |
| Ni | 0.1-0.4% |
| Nb | 0.005-0.050% |
| Al | 0.01-0.07% |
| Ti | 0.01-0.035% and |
| B | 0.001-0.004%. |

13. Tubular element according to claim 1, characterized in that the molybdenum content is less than 0.3%.

14. Gas pressure container for an airbag system of a motor vehicle, characterized in that it comprises at least one tubular element (10) according to claim 1.

* * * * *